Dec. 18, 1923.  
E. C. BALLMAN  
ROTOR FOR INDUCTION MOTORS  
Filed Jan. 19, 1920  
1,478,164

Inventor:  
EDWIN C. BALLMAN,  
John H. Bruninga  
His Attorney.

Patented Dec. 18, 1923.

1,478,164

UNITED STATES PATENT OFFICE.

EDWIN C. BALLMAN, OF ST. LOUIS, MISSOURI, ASSIGNOR TO VALLEY ELECTRIC COMPANY, OF WILMINGTON, DELAWARE, A CORPORATION OF DELAWARE.

ROTOR FOR INDUCTION MOTORS.

Application filed January 19, 1920. Serial No. 352,590.

*To all whom it may concern:*

Be it known that I, EDWIN C. BALLMAN, a citizen of the United States, and residing at St. Louis, Missouri, have invented the new and useful Improvement in Rotors for Induction Motors, of which the following is a specification.

This invention relates to rotors, and more particularly to rotors for induction motors.

In a rotor or secondary of an induction motor, the rotor bars are mounted in slots in the rotor or secondary, and these bars are connected at their ends by means of end rings to short circuit the bars.

One of the objects of this invention, therefore, is to provide a rotor in which the rotor bars and end rings are firmly connected in such a manner as to avoid as much as possible, the use of solder which, upon heating of the motor, is liable to melt.

Another object is to provide a rotor in which the end bars are so constructed and so connected with the end rings as to permit ready assembling of the structure.

Further objects will appear from the detail description taken in connection with the accompanying drawing, in which.

Figure 1:
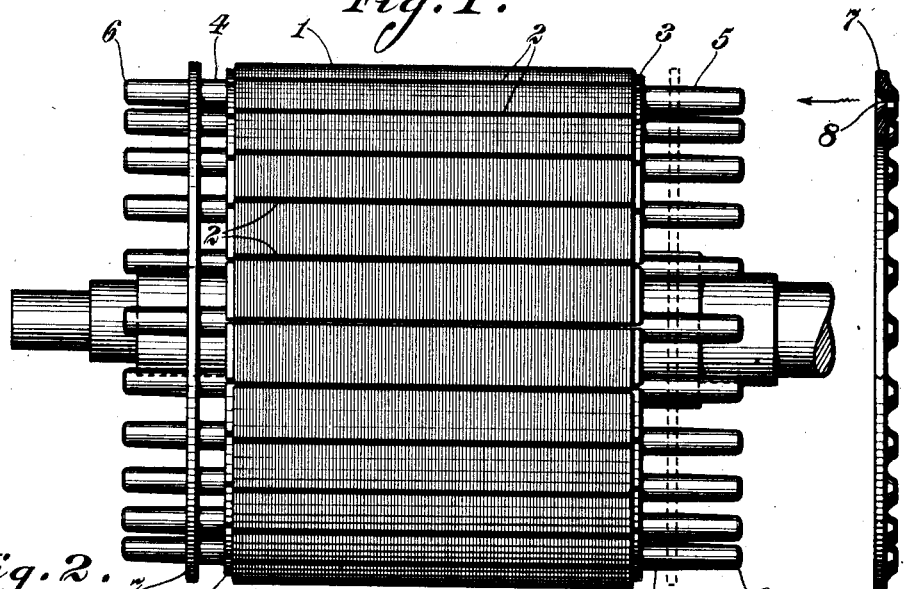
Figure 1 is an elevation of a rotor embodying this invention, and showing also one of the short-circuiting rings, part of the latter being shown in section.

Referring to the accompanying drawing, and more particularly to Figure 1, 1 designates a rotor body which, as is usual, is formed of laminations and is provided with slots 2. These slots are lined with insulation 3 and are adapted to receive rotor bars 4 which are, in this particular embodiment, of circular cross-section. The ends 5 of the bars, however, are beveled as shown at 6. The end rings 7 are perforated as shown at 8 to slip over the ends of the rotor bars and these perforations are of a diameter slightly less than the diameter of the ends of the rotor bars. In practice, the perforations are punched in a die having its die opening greater than the punch, so that the portions around the perforations bulge out. These end rings are then forced onto the rotor bars and on account of the beveled construction of the ends, the forcing of the same to the position shown in Figures 1 and 2 will make a forced or expanded joint connection between the rotor bars and the end rings. This is enhanced by inserting a hollow tool 9 over the bar ends which will force the bulged out portions in somewhat, thereby causing the ring material to tightly hug and grip the bars.

With such a construction, the ends rings make firm connections with the rotor bars so as to not only form good electrical contacts, but also prevent disengagement of the end rings from the rotor bars. This construction, therefore, practically avoids the use of solder in making the electrical and mechanical connections; although in practice the ends are dipped in solder to amalgamate the parts together.

Figure 2:
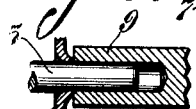
Figure 2 is a detail showing the method of applying the ring.
Figure 3:
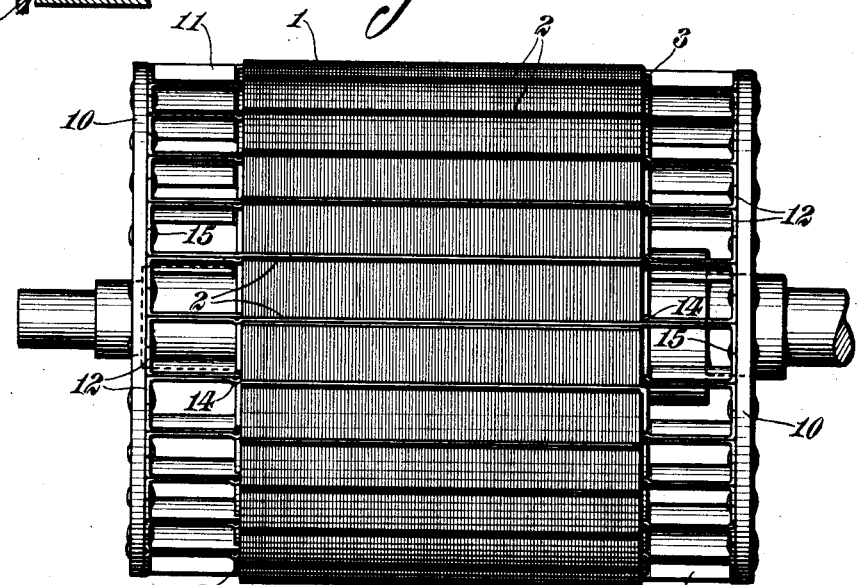
Figure 3 is a view similar to Figure 1, showing another embodiment of this invention.
Figure 4:
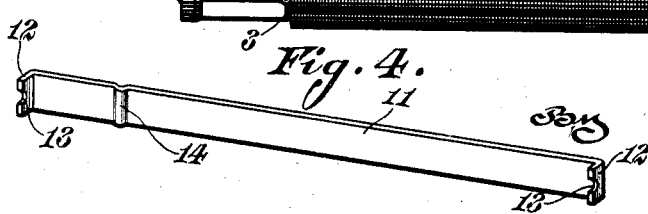
Figure 4 is a perspective view of a strip or element forming a part of a rotor bar.

In the embodiment shown in Figures 2 and 3, the end rings 10 may be of usual form. Each rotor bar, however, comprises a pair of elements 11, each in the form of a strip and each provided with a turned end 12 having a notch 13. Each element has, moreover, formed near one end thereof, a stop or rib 14 formed by bending or striking up the metal in the direction of the turned ends 12, thereby leaving the opposite faces practically smooth. In practice, a pair of these rotor bars or elements 11 are inserted into a slot 2 in the rotor body and pushed endwise in place until the stops 14 engage the opposite ends of the rotor. This will position a pair of rotor bar elements with the stops positioned oppositely of one another and engaging opposite ends of the rotor and these stops are so positioned on the elements that when the elements are in position as shown in Figure 2, the turned ends 12 will come opposite one another. After the elements are so in place, the turned ends are secured to the end rings 10 by rivets 15 passing through the end rings 10 and through the notches 13, a pair of which forms an aperture.

There is thus produced a rotor in which the winding or squirrel-cage is rigid and in which the connections are made firm and without necessarily requiring the use of solder. The construction is such as to enable the assembling to be performed quickly and in an efficient manner.

It is obvious that various changes may be made in the details of construction without departing from the spirit of this invention; and it is, therefore, to be understood that this invention is not to be limited to the specific details shown and described.

Having thus described the invention, what is claimed is:

1. In a rotor for induction motors having a slotted core, a current-carrying bar which is insertible into a rotor slot and constructed to project at its ends beyond the core in order to provide ventilating spaces, said bar having a stop spaced from one end thereof adapted by engagement with the core to position the same endwise in the slot.

2. In a rotor for induction motors having a slotted core, a current-carrying conductor comprising a pair of strips which are insertible into a rotor slot and constructed to project at their ends beyond the core in order to provide ventilating spaces, each strip having a stop spaced from one end thereof adapted by engagement with the core to position the same endwise in the slot.

3. In a slotted rotor for induction motors, a current carrying conductor, comprising, a flat bar insertible through the mouth of the slot to extend beyond the ends thereof and having bent-over ends adapted to provide connectors, and a stop on said bar adapted to position said conductor endwise in the slot.

4. In a slotted rotor for induction motors, a current carrying conductor, comprising, a flat bar insertible through the mouth of the slot to extend beyond the ends thereof and having bent-over ends adapted to provide connectors, and a projection on said bar adapted to provide a stop for positioning said conductor in the slot.

5. In a slotted rotor for induction motors employing end rings, a current-carrying conductor comprising a pair of strips, each of which has a stop near one end thereof adapted to engage the rotor, and each of which strips has a turned end adapted to connect with an end ring.

6. In a slotted rotor for induction motors employing end rings, a current-carrying conductor comprising a pair of strips, each of which has a stop near one end thereof, the stops of the pair being adapted to engage opposite ends of the rotor, and each of which strips has turned ends adapted to connect with the end rings.

In testimony whereof I affix my signature this 21st day of June, 1919.

EDWIN C. BALLMAN.